Patented Apr. 21, 1931

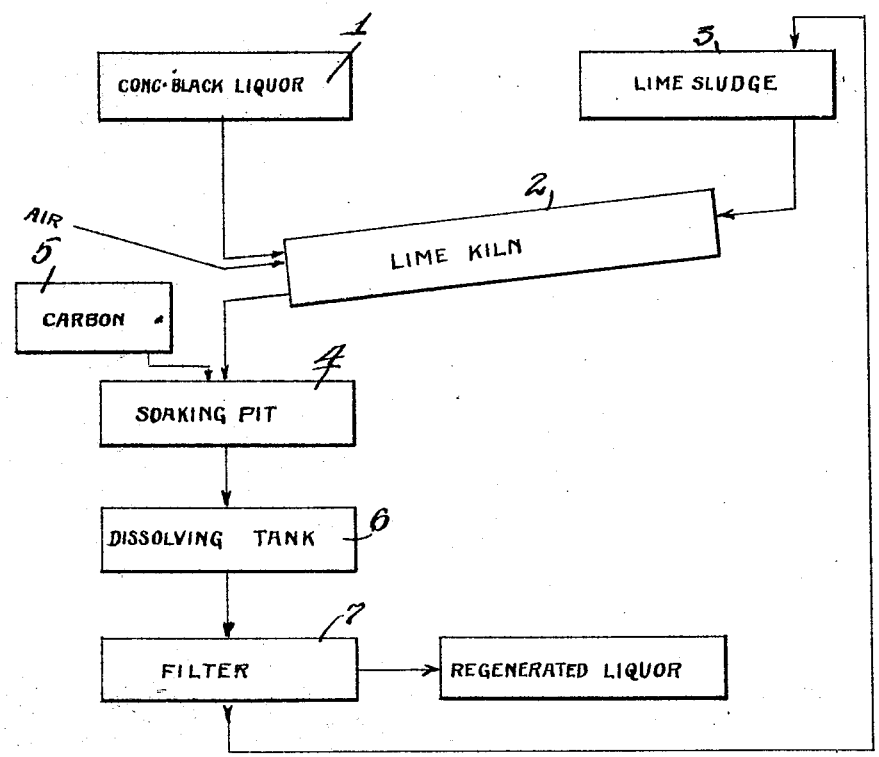

1,801,945

UNITED STATES PATENT OFFICE

ALFRED H. WHITE, OF ANN ARBOR, MICHIGAN, ASSIGNOR TO JOHN E. ALEXANDER, OF PORT EDWARDS, WISCONSIN, AND E. G. GOODELL, OF STEVENS POINT, WISCONSIN, TRUSTEES

PROCESS FOR REGENERATING LIQUORS CONTAINING ALKALI SALTS AND ORGANIC MATTER

Application filed October 21, 1927. Serial No. 227,661.

This invention relates to a process for regenerating liquors containing alkali metal salts and organic matter and more particularly to a process for regenerating spent liquors as obtained in the manufacture of wood pulp by the soda and sulphate processes.

In the present processes for the manufacture of paper pulp from wood by the soda and sulphate processes, the wood is digested with an aqueous solution of sodium salts, and after the digestion is complete, the waste liquor, containing organic matter, is concentrated and finally burned incompletely, yielding a charred mass containing sodium salts. In the soda process this black ash, whose chief inorganic salt is sodium carbonate, is leached and causticized with lime to regenerate caustic soda, and in the sulphate process, the black ash is burned in a smelter under reducing conditions so that the sulphur compounds are reduced to sulphide and are in part converted to carbonate, both of which become fused and flow from the smelter in molten form. The molten mass is run into water where it dissolves and is later causticized with lime. The lime sludge resulting from both of these processes may be reburned in a rotary lime kiln and used instead of fresh lime.

This process of reduction of the sulphates in the smelter involves a high temperature with consequent loss of sodium salts through volatilization and is a disagreeable and objectionable process. I have proposed in my United States Letters Patent No. 1,565,300 entitled "Process for reducing sulphates and the like", issued December 15th, 1925, to carry out this reduction at a lower temperature and avoid the loss of sodium salts and the nuisance of the fusion by carrying out the reduction by carbonaceous material in the presence of lime. I now propose to extend the advantages of this process by producing an intimate mixture of the sodium salts and the lime within the lime kiln itself by utilizing the concentrated black liquors as fuel in the lime kiln. While this feature is especially applicable to the sulphate process for the manufacture of paper pulp, it also is advantageous in the soda process for making paper pulp and in any other process where organic tissues are treated with caustic solutions, and it is desired to recover the inorganic materials used.

It is therefore an object of this invention to provide a process for regenerating liquors containing alkali metal salts and organic matter wherein the liquors are concentrated to such an extent that the effective heating value of the concentrated liquor can be utilized in the calcining of calcium carbonate to produce a solid material which is not easily fusible and has no tendency to stick to the interior surface of a lime kiln.

It is a further object of this invention to provide a process for regenerating black liquor obtained from the manufacture of pulp by the sulphate process, wherein the heating value of the black liquor is utilized to calcine calcium carbonate and the solid resulting material while still hot subjected to a reduction step to produce sodium sulphide.

Other and further important objects of this invention will be apparent from the following description and appended claims.

On the drawings:

There is represented a diagrammatic flow sheet of the process as applied in the recovery of liquors from a plant making paper pulp by the sulphate process.

The reference numeral 1 represents a storage tank for concentrated black liquors. From the tank 1 the concentrated black liquors are delivered into the lower end of the inclined rotary lime kiln 2, into the upper end of which is fed lime sludge from a storage bin 3. The heat of the combustion products resulting from the burning of the concentrated black liquor effects the calcination of the calcium carbonate in the lime sludge. The concentrated black liquor is preferably sprayed into the lower end of the lime kiln 2 so that there results an effective mixing of the non-combustible portion of the black liquor, consisting mainly of sodium salts, with the lime sludge coming down the lime kiln. The residue leaving the bottom of the lime kiln consists mainly of calcium oxide, sodium sulphate and sodium carbonate. This residue or solid material drops while still being at a red heat directly into a soaking pit 4, of which several may be provided. As the nodules of solid matter drop into the soaking pit 4, sufficient carbonaceous material is added from a storage tank 5 to cause the reduction of the sodium sulphate to sulphide as provided in my Patent No. 1,565,300. When one of the soaking pits has become full, it is closed and allowed to stay at a temperature above 1000° F. and preferably about 1300° F. until the sulphate has been reduced.

The reduction mass from the soaking pit 4 is then placed into a dissolving tank 6 containing water to effect solution of the sodium salts and hydration of the lime. The lime and sodium salts react to give a solution containing NaOH, $Na_2S$, and other sodium salts. This liquor is passed through a filter 7 wherein the calcium carbonate sludge is removed and the filtered liquor is then ready to be returned to the pulp digesters leaving the lime sludge to be returned to the storage tank 3.

The following illustration shows the heat balance in a lime kiln operating on liquor from the sulphate process of pulp manufacture under the following assumptions:

|  | Composition of concentrated black liquor in per cent | Quantity per ton of pulp |
|---|---|---|
|  |  | Lbs. |
| Organic matter | 37.5 | 1500 |
| Soda salts | 25.0 | 1000 |
| Water | 37.5 | 1500 |
|  |  | 4000 |

The heating value of the organic matter is assumed to be 9000 B. t. u. per lb. which gives the black liquor a heating value of 3375 B. t. u. per lb. The water in the black liquor must be vaporized and superheated as it leaves the kiln to about 1000° F. This requires about 1600 B. t. u. per lb. of water which corresponds to 600 B. t. u. per pound of black liquor. This leaves 2775 B. t. u. per pound of liquor available for burning lime. Five thousand B. t. u. is a liberal allowance to burn one pound of quicklime. It is assumed that 1000 pounds of quicklime are used per ton of pulp which gives the following heat balance:

Heat absorbed in lime kiln                                      B. t. u.
  To burn 1000 lbs. lime..............................5,000,000
  To heat 1000 lbs. sodium salts to 1800° F...........540,000
                                                      5,540,000
Heat evolved in lime kiln
  From combustion 4000 lbs.
  black liquors of 2775 B. t. u.....................11,100,000

Thus the heat evolved by the black liquors is twice as great as is needed for the operation of the lime kiln. It is apparent that more dilute liquors could be burned or that more lime could be used than has been assumed in the above illustration, and still have more heat liberated than is needed in the lime kiln. The minimum amount of lime will be that needed to prevent fusion of the mass in the kiln and as little as one pound of calcium carbonate to one pound of soluble inorganic salts will suffice with careful operation.

The combustion of the black liquors also is facilitated in this process by the contact with lime since the liquors are sprayed onto an infusible material of constantly changing surface maintained at a red heat which by its extended surface facilitates the combustion of the black liquors. Lime has a special advantage since it is a material which does not itself fuse in the lime kiln and does not readily form a fusible slag with sodium salts. The completeness of combustion in this process helps materially to prevent any nuisance due to odors from the incomplete combustion of sulphate liquors. The long lime kiln with damp sludge at its upper end also assists materially in recovering sodium salts and acid sulphur fumes which might be carried out of the zone of combustion.

Although the step of reduction of sulphates to sulphides may be especially easily carried out by this process, this step is not essential to the process, which is also applicable to the soda process of making paper pulp or to any other process where it is desirable to recover causticized inorganic salts from liquors carrying organic matter in solution.

The reduction of $Na_2SO_4$ is effected by adding some carbonaceous material to the solid material falling from the lime kiln into the soaking pit. Since the lumps of lime will leave the kiln at about 1800° F., it is evident that there is surplus heat in the lumps of lime. This permits some of the concentrated black liquors to be used as a reducing agent if desired, a spray of black liquor being directed into the lower part of the kiln in such a manner that the combustion is incomplete, and that the material which leaves the kiln contains intermingled carbonaceous matter. The liquor may also be directed as a fine spray on the lime as it enters the soaking pit in such amount that the water of the black liquor is evaporated through the sensible heat of the solid residue without, however, reducing the temperature of the materials in the soaking pit below 1300° F.

Another advantage of my process is the lessened amount of silica introduced into the system. In the present sulphate process, the silica is largely introduced through corrosion of the walls of the smelter and through the introduction of ash from coal which may be used as a fuel in the lime kiln. Both of these sources of silica are eliminated in my process.

I am aware that numerous details of the process may be varied through a wide range without departing from the spirit of this invention, and I therefore do not purpose limiting the patent granted, otherwise than necessitated by the prior art.

I claim as my invention:

In a process for regenerating liquors containing alkali sulphur compounds and organic matter, the steps which comprise burning the liquors with calcium carbonate to form a solid material containing quicklime and alkali metal sulphates, maintaining the temperature of the solid material above 1650° F. and mixing with said hot solid material sufficient fresh liquor containing organic combustible material to effect a substantial reduction of the sulphates to sulphides without lowering the temperature of the solid material below 1000° F.

In testimony whereof I have hereunto subscribed my name.

ALFRED H. WHITE.